United States Patent
Seydel et al.

(10) Patent No.: US 12,552,939 B2
(45) Date of Patent: Feb. 17, 2026

(54) OPTICAL DEVICES WITH FUNCTIONAL MOLECULES

(71) Applicant: VIAVI SOLUTIONS INC., San Jose, CA (US)

(72) Inventors: Johannes Seydel, Petaluma, CA (US); Kangning Liang, Santa Rosa, CA (US); Jaroslaw Zieba, Santa Rosa, CA (US); Carole Thoraval, Santa Rosa, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 113 days.

(21) Appl. No.: 16/023,355

(22) Filed: Jun. 29, 2018

(65) Prior Publication Data
US 2020/0004100 A1    Jan. 2, 2020

(51) Int. Cl.
C09C 1/00    (2006.01)
B05D 5/06    (2006.01)
G02F 1/17    (2019.01)

(52) U.S. Cl.
CPC ............ C09C 1/0015 (2013.01); B05D 5/063 (2013.01); G02F 1/17 (2013.01); *C09K 2323/04* (2020.08); *C09K 2323/05* (2020.08); *C09K 2323/057* (2020.08); *G02F 2201/34* (2013.01); *G02F 2202/22* (2013.01); *G02F 2203/055* (2013.01)

(58) Field of Classification Search
CPC ............. B05D 5/063; C09C 1/0015; C09C 2200/1054; C09C 2200/301; C09C 2200/304–305; C09C 2200/308; G02F 1/17; G02F 2201/34; G02F 2202/22; G02F 2203/055
See application file for complete search history.

(56) References Cited

U.S. PATENT DOCUMENTS

| | | | |
|---|---|---|---|
| 2,688,007 A | 8/1954 | Steinman | |
| 3,354,138 A | * 11/1967 | Burr | ............... C08L 23/06 |
| | | | 524/910 |
| 3,425,975 A | 2/1969 | James | |
| 3,997,485 A | 12/1976 | Dowbenko et al. | |

(Continued)

FOREIGN PATENT DOCUMENTS

| | | | |
|---|---|---|---|
| CN | 1080317 A | * | 1/1994 |
| CN | 1286761 A | | 3/2001 |

(Continued)

OTHER PUBLICATIONS

"200 Questions on UV Optical Technology", Gao Jing, p. 33, Printing Industry Press, Jan. 2012, 17 pages (relevant p. 33).

(Continued)

*Primary Examiner* — Sophie Hon
(74) *Attorney, Agent, or Firm* — Mannava & Kang, P.C.

(57) ABSTRACT

An optical device includes a reflector layer; a selective light modulating layer external to the reflector layer; and functional molecules present in at least one of the selective light modulating layer, in a functional layer external to a surface of the selective light modulating layer, in the selective light modulating layer near an external surface, in the selective light modulating layer near the reflector layer, and in a functional layer external to the reflector layer. A method of making an optical device is also disclosed.

20 Claims, 4 Drawing Sheets

(56) References Cited

U.S. PATENT DOCUMENTS

| | | |
|---|---|---|
| 4,017,326 A | 4/1977 | Davis |
| 4,071,489 A | 1/1978 | Emmons et al. |
| 4,100,133 A | 7/1978 | Emmons et al. |
| 4,129,537 A | 12/1978 | Dhein et al. |
| 4,216,252 A | 8/1980 | Moeller |
| 4,332,861 A | 6/1982 | Franz et al. |
| 4,639,069 A | 1/1987 | Yatabe et al. |
| 5,055,345 A | 10/1991 | Wank et al. |
| 5,102,925 A | 4/1992 | Suzuki et al. |
| 5,135,812 A | 8/1992 | Phillips et al. |
| 5,136,404 A | 8/1992 | Nobile et al. |
| 5,219,900 A | 6/1993 | Davies et al. |
| 5,346,569 A | 9/1994 | Simon |
| 5,471,331 A | 11/1995 | Takizawa et al. |
| 5,569,535 A | 10/1996 | Phillips et al. |
| 5,582,645 A | 12/1996 | Trest et al. |
| 5,641,544 A | 6/1997 | Melancon et al. |
| 5,700,607 A | 12/1997 | Rath et al. |
| 5,743,981 A | 4/1998 | Lu |
| 5,877,895 A | 3/1999 | Shaw et al. |
| 6,132,504 A * | 10/2000 | Kuntz ............... C09D 5/36 427/217 |
| 6,139,613 A | 10/2000 | Hendrickson et al. |
| 6,150,022 A | 11/2000 | Coulter et al. |
| 6,153,295 A * | 11/2000 | Nishizawa ......... G11B 5/7022 428/323 |
| 6,156,115 A | 12/2000 | Pfaff et al. |
| 6,235,105 B1 | 5/2001 | Hubbard et al. |
| 6,236,510 B1 | 5/2001 | Bradley, Jr. et al. |
| 6,243,204 B1 | 6/2001 | Bradley, Jr. et al. |
| 6,299,979 B1 | 10/2001 | Neubauer et al. |
| 6,376,018 B1 | 4/2002 | Kittler, Jr. |
| 6,383,638 B1 | 5/2002 | Coulter et al. |
| 6,531,221 B1 | 3/2003 | Schuhmacher et al. |
| 6,565,770 B1 | 5/2003 | Mayer et al. |
| 6,572,784 B1 * | 6/2003 | Coombs ............. B82Y 10/00 106/403 |
| 6,596,070 B1 | 7/2003 | Schmidt et al. |
| 6,686,042 B1 | 2/2004 | LeGallee |
| 6,749,936 B2 | 6/2004 | Argoitia et al. |
| 6,783,349 B2 | 8/2004 | Neavin et al. |
| 6,808,806 B2 | 10/2004 | Phillips et al. |
| 6,818,299 B2 | 11/2004 | Phillips et al. |
| 6,841,238 B2 | 1/2005 | Argoitia et al. |
| 6,894,086 B2 | 5/2005 | Munro et al. |
| 6,913,783 B2 | 7/2005 | Lazarev et al. |
| 6,979,704 B1 | 12/2005 | Mayer et al. |
| 6,997,981 B1 | 2/2006 | Coombs et al. |
| 7,258,900 B2 | 8/2007 | Raksha et al. |
| 7,390,715 B2 | 6/2008 | Ou et al. |
| 7,455,904 B2 | 11/2008 | O'Keefe |
| 7,518,284 B2 | 4/2009 | Benslimane et al. |
| 7,625,596 B2 | 12/2009 | Lewis et al. |
| 7,629,051 B2 | 12/2009 | Fukushige et al. |
| 7,719,187 B2 | 5/2010 | Ray et al. |
| 7,767,123 B2 | 8/2010 | Argoitia |
| 7,850,359 B2 | 12/2010 | Jeng et al. |
| 7,951,418 B2 | 5/2011 | O'Keefe |
| 8,252,412 B2 | 8/2012 | Purdy et al. |
| 8,372,685 B2 | 2/2013 | Robinson et al. |
| 8,454,859 B2 | 6/2013 | Lowenthal et al. |
| 8,557,332 B2 | 10/2013 | Watanabe et al. |
| 8,586,457 B1 | 11/2013 | Liang et al. |
| 8,591,775 B2 | 11/2013 | Fujdala et al. |
| 8,641,933 B2 | 2/2014 | Purdy et al. |
| 8,715,537 B2 | 5/2014 | Fujdala et al. |
| 8,815,337 B2 | 8/2014 | Yializis et al. |
| 8,852,476 B2 | 10/2014 | Decker |
| 9,012,261 B2 | 4/2015 | Van Duren et al. |
| 9,105,526 B2 | 8/2015 | Le et al. |
| 9,105,527 B2 | 8/2015 | Van Duren et al. |
| 9,212,089 B2 | 12/2015 | Arsten et al. |
| 9,822,275 B2 | 11/2017 | Hibben et al. |
| 10,048,415 B2 | 8/2018 | Banerjee et al. |
| 10,207,479 B2 | 2/2019 | Seydel et al. |
| 10,493,724 B2 | 12/2019 | Seydel et al. |
| 10,882,280 B2 | 1/2021 | Seydel et al. |
| 10,928,579 B2 | 2/2021 | Seydel et al. |
| 11,214,689 B2 | 1/2022 | Seydel et al. |
| 11,650,473 B2 | 5/2023 | Vitic et al. |
| 12,050,390 B2 | 7/2024 | Kozlowski et al. |
| 12,187,900 B2 | 1/2025 | Seydel et al. |
| 12,275,852 B2 | 4/2025 | Seydel et al. |
| 2001/0047739 A1 * | 12/2001 | Archambeault .......... C09C 1/62 106/404 |
| 2002/0015914 A1 | 2/2002 | Miyamoto et al. |
| 2002/0137819 A1 | 9/2002 | Polonka et al. |
| 2002/0160194 A1 | 10/2002 | Phillips et al. |
| 2003/0195270 A1 | 10/2003 | Ishii et al. |
| 2003/0203222 A1 | 10/2003 | Phillips et al. |
| 2003/0215641 A1 | 11/2003 | Phillips et al. |
| 2004/0001973 A1 | 1/2004 | Gao et al. |
| 2004/0012838 A1 | 1/2004 | Huibers |
| 2004/0028905 A1 * | 2/2004 | Phillips ................. B42D 25/29 428/404 |
| 2004/0101676 A1 | 5/2004 | Phillips et al. |
| 2004/0160672 A1 | 8/2004 | Phillips |
| 2004/0166308 A1 | 8/2004 | Raksha et al. |
| 2005/0018272 A1 | 1/2005 | Kimura |
| 2005/0117623 A1 | 6/2005 | Shchukin et al. |
| 2005/0150740 A1 | 7/2005 | Finkenzeller et al. |
| 2005/0196584 A1 | 9/2005 | Halecki et al. |
| 2006/0023327 A1 | 2/2006 | Coombs et al. |
| 2006/0063004 A1 * | 3/2006 | Takano ................. B82Y 30/00 428/407 |
| 2006/0068115 A1 | 3/2006 | Ogawa |
| 2006/0094323 A1 | 5/2006 | Hong et al. |
| 2006/0103781 A1 | 5/2006 | Jeng et al. |
| 2006/0188664 A1 | 8/2006 | Ando et al. |
| 2006/0263539 A1 | 11/2006 | Argoitia |
| 2006/0285184 A1 | 12/2006 | Phillips et al. |
| 2006/0287412 A1 * | 12/2006 | Niizaki .................. C09C 3/12 523/171 |
| 2007/0062445 A1 | 3/2007 | Kodou et al. |
| 2007/0070494 A1 | 3/2007 | Brott et al. |
| 2007/0230191 A1 | 10/2007 | Komuro et al. |
| 2007/0231571 A1 | 10/2007 | Lane et al. |
| 2008/0022899 A1 * | 1/2008 | Tsuji .................... C09D 5/032 106/404 |
| 2008/0118752 A1 * | 5/2008 | Inoue ..................... G02B 1/10 428/354 |
| 2008/0129928 A1 | 6/2008 | Jeng |
| 2008/0170192 A1 | 7/2008 | Jeng |
| 2008/0180803 A1 | 7/2008 | Seybert et al. |
| 2009/0081460 A1 | 3/2009 | Argoitia et al. |
| 2009/0322993 A1 | 12/2009 | Saitoh et al. |
| 2010/0055401 A1 | 3/2010 | Choi et al. |
| 2010/0095868 A1 | 4/2010 | Kaupp et al. |
| 2010/0140916 A1 | 6/2010 | Firth et al. |
| 2010/0261017 A1 | 10/2010 | Kikuchi |
| 2011/0013260 A1 | 1/2011 | Ohno et al. |
| 2011/0042649 A1 | 2/2011 | Duvall et al. |
| 2011/0299167 A1 | 12/2011 | Woolf |
| 2012/0028009 A1 | 2/2012 | Gerardin et al. |
| 2012/0108700 A1 | 5/2012 | Kanzaki et al. |
| 2012/0177844 A1 | 7/2012 | Biver et al. |
| 2013/0058988 A1 * | 3/2013 | Winkelmann ............ C09C 1/62 106/404 |
| 2013/0095333 A1 | 4/2013 | Pal et al. |
| 2013/0164529 A1 | 6/2013 | Yu et al. |
| 2013/0233739 A1 | 9/2013 | Zhao et al. |
| 2013/0280854 A1 | 10/2013 | Jasieniak et al. |
| 2014/0035995 A1 | 2/2014 | Chou et al. |
| 2014/0037890 A1 | 2/2014 | McJunkins et al. |
| 2014/0050768 A1 | 2/2014 | Struck et al. |
| 2014/0110813 A1 | 4/2014 | Liang et al. |
| 2014/0151607 A1 | 6/2014 | Lowenthal et al. |
| 2014/0210200 A1 | 7/2014 | Bornschlegl et al. |
| 2014/0322452 A1 | 10/2014 | Kasyanova et al. |
| 2014/0322549 A1 | 10/2014 | Xu et al. |
| 2014/0371343 A1 * | 12/2014 | Yan ..................... C09D 163/00 523/451 |

(56) References Cited

U.S. PATENT DOCUMENTS

| | | | |
|---|---|---|---|
| 2014/0371358 A1* | 12/2014 | Kikuchi | C09D 11/322 524/114 |
| 2015/0099119 A1 | 4/2015 | Farrand et al. | |
| 2015/0118408 A1 | 4/2015 | Hong et al. | |
| 2015/0123049 A1 | 5/2015 | Farrand et al. | |
| 2015/0126680 A1 | 5/2015 | Farrand et al. | |
| 2015/0129817 A1 | 5/2015 | Farrand et al. | |
| 2015/0129818 A1 | 5/2015 | Blackman et al. | |
| 2015/0129819 A1 | 5/2015 | Farrand et al. | |
| 2015/0168746 A1 | 6/2015 | Blackman et al. | |
| 2015/0184031 A1 | 7/2015 | Yurt et al. | |
| 2015/0220057 A1 | 8/2015 | Tziovaras et al. | |
| 2015/0235745 A1 | 8/2015 | Choe et al. | |
| 2015/0309353 A1 | 10/2015 | Stensvad et al. | |
| 2015/0316686 A1 | 11/2015 | Vanier et al. | |
| 2015/0323879 A1* | 11/2015 | Kabalnov | G03G 9/1355 428/207 |
| 2016/0076242 A1 | 3/2016 | Becker Iv et al. | |
| 2016/0085944 A1 | 3/2016 | Brophy et al. | |
| 2016/0088756 A1 | 3/2016 | Ramadas | |
| 2016/0145437 A1* | 5/2016 | Ponce | A61Q 3/02 106/404 |
| 2016/0168177 A1 | 6/2016 | Cunningham et al. | |
| 2016/0264810 A1 | 9/2016 | Okamoto et al. | |
| 2016/0326374 A1 | 11/2016 | Blume et al. | |
| 2016/0333526 A1 | 11/2016 | Macpherson et al. | |
| 2017/0291401 A1 | 10/2017 | Yamane et al. | |
| 2017/0363786 A1 | 12/2017 | Peng et al. | |
| 2017/0368798 A1 | 12/2017 | Seydel et al. | |
| 2017/0368866 A1 | 12/2017 | Seydel et al. | |
| 2017/0369709 A1 | 12/2017 | Seydel et al. | |
| 2017/0371091 A1 | 12/2017 | Seydel et al. | |
| 2018/0251637 A1* | 9/2018 | Zieba | C09C 1/64 |
| 2020/0004100 A1 | 1/2020 | Seydel et al. | |
| 2020/0032111 A1 | 1/2020 | Ogawa et al. | |
| 2021/0141144 A1 | 5/2021 | Seydel et al. | |
| 2022/0089878 A1 | 3/2022 | Seydel et al. | |
| 2024/0377694 A1 | 11/2024 | Kozlowski et al. | |
| 2025/0145832 A1 | 5/2025 | Seydel et al. | |

FOREIGN PATENT DOCUMENTS

| | | | | |
|---|---|---|---|---|
| CN | 1423212 A | | 6/2003 | |
| CN | 1485146 A | | 3/2004 | |
| CN | 1748874 A | | 3/2006 | |
| CN | 1825140 A | | 8/2006 | |
| CN | 1946818 A | | 4/2007 | |
| CN | 101210975 A | | 7/2008 | |
| CN | 101265681 A | | 9/2008 | |
| CN | 100592980 C | | 3/2010 | |
| CN | 101680975 A | | 3/2010 | |
| CN | 101970587 A | | 2/2011 | |
| CN | 102077060 A | | 5/2011 | |
| CN | 102221722 A | | 10/2011 | |
| CN | 102481723 A | | 5/2012 | |
| CN | 102483567 A | | 5/2012 | |
| CN | 101897036 B | | 8/2012 | |
| CN | 103415352 A | | 11/2013 | |
| CN | 103608183 A | | 2/2014 | |
| CN | 102587126 B | * | 4/2014 | |
| CN | 103998955 A | | 8/2014 | |
| CN | 104884265 A | | 9/2015 | |
| CN | 105283602 A | | 1/2016 | |
| CN | 105474085 | | 4/2016 | |
| CN | 106032407 A | | 10/2016 | |
| CN | 106537103 | | 3/2017 | |
| CN | 107544105 | | 1/2018 | |
| CN | 110658568 B | * | 7/2021 | G02B 1/04 |
| CN | 113433603 B | * | 5/2023 | G02F 1/17 |
| DE | 10349000 A1 | | 5/2005 | |
| DE | 102005017169 A1 | | 10/2006 | |
| DE | 102013021180 A1 | | 6/2015 | |
| DE | 102014001688 A1 | | 8/2015 | |
| EP | 0033896 A1 | | 8/1981 | |
| EP | 1239307 A1 | | 9/2002 | |
| EP | 1918334 A2 | | 5/2008 | |
| EP | 2538247 A2 | | 12/2012 | |
| EP | 3266835 A1 | | 1/2018 | |
| EP | 3269780 A1 | | 1/2018 | |
| JP | S5227892 | | 6/1977 | |
| JP | S55160060 A | | 12/1980 | |
| JP | S5926251 A | | 2/1984 | |
| JP | S60184001 U | | 12/1985 | |
| JP | S6221041 U | | 2/1987 | |
| JP | H0136891 | | 11/1989 | |
| JP | H0272700 A | | 3/1990 | |
| JP | H05134113 A | | 5/1993 | |
| JP | H09113927 A | | 5/1997 | |
| JP | H10202153 A | | 8/1998 | |
| JP | 2001325745 A | | 11/2001 | |
| JP | 2003156768 A | | 5/2003 | |
| JP | 2003335880 A | | 11/2003 | |
| JP | 2006176742 A | | 7/2006 | |
| JP | 2006348250 A | | 12/2006 | |
| JP | 2007011309 A | | 1/2007 | |
| JP | 2007232958 A | | 9/2007 | |
| JP | 2008088317 A | | 4/2008 | |
| JP | 2008532069 A | | 8/2008 | |
| JP | 2008221734 A | | 9/2008 | |
| JP | 2009520844 A | | 5/2009 | |
| JP | 2009230779 A | * | 10/2009 | |
| JP | 2010066326 A | | 3/2010 | |
| JP | 2011016291 A | | 1/2011 | |
| JP | 2011221376 A | | 11/2011 | |
| JP | 2012097135 A | | 5/2012 | |
| JP | 2012177938 A | | 9/2012 | |
| JP | 2013050524 A | | 3/2013 | |
| JP | 2013225296 A | | 10/2013 | |
| JP | 2013242396 A | | 12/2013 | |
| JP | 2016072422 A | | 5/2016 | |
| JP | 2016088042 A | | 5/2016 | |
| JP | 2017057375 A | | 3/2017 | |
| JP | 2018028656 | | 2/2018 | |
| JP | 2018048302 | | 3/2018 | |
| JP | 7378981 B2 | * | 11/2023 | G02B 1/10 |
| KR | 1020060011158 A | | 2/2006 | |
| KR | 1020080060707 A | | 7/2008 | |
| KR | 1020090025217 A | | 3/2009 | |
| KR | 20100081163 A | | 7/2010 | |
| KR | 20100138974 A | | 12/2010 | |
| WO | 9010246 A1 | | 9/1990 | |
| WO | 9938034 | | 7/1999 | |
| WO | 0031571 A1 | | 6/2000 | |
| WO | 03077019 A1 | | 9/2003 | |
| WO | 2004016441 A2 | | 2/2004 | |
| WO | 2004072186 A1 | | 8/2004 | |
| WO | 2005019350 A1 | | 3/2005 | |
| WO | 2006007742 A1 | | 1/2006 | |
| WO | 2008061930 A1 | | 5/2008 | |
| WO | 2012078820 A2 | | 6/2012 | |
| WO | 2013079542 A2 | | 6/2013 | |
| WO | 2014085473 A1 | | 6/2014 | |
| WO | 2014140427 A1 | | 9/2014 | |
| WO | 2015136531 A2 | | 9/2015 | |
| WO | 2016060173 A1 | | 4/2016 | |
| WO | 2016076333 A1 | | 5/2016 | |
| WO | 2016156863 A2 | | 10/2016 | |
| WO | 2017056803 A1 | | 4/2017 | |

OTHER PUBLICATIONS

"Acid-catalyzed synthesis of butane-1, 2-propanediol condensation agent using phosphorus supported on silica", Yang Shui-Jin et al., Chemical Intermediate, No. 11, Nov. 15, 2012, 3 pages.

"New Technology of Modern Coating Technology", Liu Guojie, (relevant p. 231), China Light Industry Press, Apr. 2000, 32 pages.

"Office Action, China Application No. 202011447471.9", mailed date Sep. 30, 2022 with portion English translation cited as the concise statement of relevance regarding NPL reference Cohen.

"Quantum Dots", Sigma-Aldrich (RTM), retrieved from "https://www.sigmaaldrich.com/technical-documents/articles/materials- (56) References Cited

OTHER PUBLICATIONS science/nanomaterials/quantum-dots.html" on Mar. 12, 2020. (Year: 2020).
"Study on influences of oxygen for photochemical solidification adhesive solidification", Wang ZhengpingChemical Engineer, vol. 107, No. 8, Aug. 30, 2004, 10 pages.
BASF brochure entitled "High lights! Radiation curing with resins and photoinitiators for industrial coatings and graphic arts: Laromer®, Irgacure®, Lucirin®, Darocur®", BASF The Chemical Company, Aug. 6, 2014, 44 pages.
Byk-306, Technical Data Sheet, Byk (Rtm) Additives & Instruments, Nov. 2012. (Year: 2012).
BYK-361 N, Technical Data Sheet, Byk (Rtm) Additives & Instruments, Dec. 2012. (Year: 2012).
Cohen et al., "Modern Coating and Drying Technology", John Wiley & Sons, Inc., Oct. 1999, 6 pages.
Daniel R. Swiler, "Pigments, Inorganic", Kirk-Othmer Encyclopedia of Chemical Technology, Published online on Aug. 19, 2005, 38 pages.
DU Zhenxia et al., "Research on surface modification of nano-calcium carbonate and its application in coatings". Journal of Beijing University of Chemical Technology, vol. 26, No. 2, Jun. 30, 1999, 8 pages.
European Patent Office, "The extended European search report for EP Application No. 25165075.0", dated May 21, 2025, 7 pages.
Hubei Paper, No. 4, "Study on the Effect of Nanoscale Calcium Carbonate on the Properties of Coatings and Papers", Zhang Heng et al., Dec. 30, 2003, 9 pages.
Husar, et al., "The formulator's guide to anti-oxygen inhibition additives", Progress in Organic Coatings 77, 2014, p. 1789-1798, 10 pages.
IM&P, "Chemical Minerals and Processing", No. 5, May 25, 2003, 4 pages.
LI Huachun et al., "The inhibitory effect of oxygen in the photocuring process of coatings", Modern Plastics Processing and Application, vol. 14, No. 4, Aug. 15, 2002, 12 pages.
LIU Guojie et al., "Some new developments in research and development of acrylic resins and coatings", Monographs and Reviews, vol. 15, No. 8, Aug. 20, 2012, 18 pages.
Liu Junhua, et al., "Synthesis of multifunctional acrylated pilyester and its photocuring", Thermosetting Resin, vol. 18, No. 1, Jan. 30, 2003, 13 pages.
Mitigation of Oxygen Inhibition in UV LED, UVA, and Low Intensity UV Cure, RadTech 2014, 11 pages.
Modaflow (Rtm) Resin, Technical Datasheet, Version 5.0, Allnex, Jun. 18, 2020. (Year: 2020).
Paint Additives, Product Guide L-G 1, BYK (RTM) Additives & Instruments, Feb. 2009. (Year: 2009).
Penzel, E. "Polyacrylates", In Ullmann's Encyclopedia of Industrial Chemistry, year 2000, vol. 28, pp. 515-536.
Polymer Bulletin, No. 9, Sun Jiazhen, et al., Aug. 28, 2015, 37 pages.
Progress in Chemistry, vol. 23, No. 11, Chen Bingkun et al., Nov. 24, 2011, 33 pages.
Quantum dot, Wikipedia (RTM), Retrieved from "https://en.wikipedia.org/w/index.php?title=Quantum_dot&oldid=942721024" on Mar. 12, 2020. (Year: 2020).
Satosi Kobayashi, Toyo Aluminium K.K., "Product Report: Colored aluminium paste", Fall 2012, 2 pages.

* cited by examiner

OPTICAL DEVICES WITH FUNCTIONAL MOLECULES

FIELD OF THE INVENTION

The present disclosure generally relates to articles, such as optical devices in the form of foil, sheets, and/or flakes. The optical devices can include a reflector layer; a selective light modulator layer external to the reflector layer; and functional molecules present in at least one of the selective light modulator layer, in a functional layer external to a surface of the selective light modulator layer, in the selective light modulator layer near an external surface, in the selective light modulator layer near the reflector layer, and in a functional layer external to the reflector layer. In another aspect, the optical devices can include a reflector layer; a selective light modulator layer external to the reflector layer; and functional molecules present in at least one of the reflector layer, in a functional layer external to a surface of the reflector layer, in the reflector layer near an external surface, and in the reflector layer near the selective light modulator layer. Methods of making the optical devices are also disclosed.

BACKGROUND OF THE INVENTION

Pigment flakes in paint systems have to be compatible with the chemistry of the particular paint system. If the pigment flake material is not compatible with the paint system, the intended optical effect cannot be achieved due to mis-orientation of pigment flakes in the paint. For certain applications, a random flake orientation is required. In order to have control over the flake behavior in the paint, the surface energy of the flake needs to be controlled, as well hydrophobic or hydrophilic properties adjusted as needed. The compatibilization of conventional pigment flakes requires a separate chemical coating step in a chemical bath to apply e.g. silane functionality for compatibilization with the desired paint chemistry. Material properties of a vacuum deposited pigment flake cannot be gradually adjusted as all materials have to be evaporated in vacuum, which drastically limits the options for materials selection. Functionality can only be added in a separate chemical coating step for the vacuum prepared pigment flakes, not as a part of the layer coating process.

SUMMARY OF THE INVENTION

In an aspect, there is disclosed an optical device comprising a reflector layer; a selective light modulator layer external to the reflector layer; and functional molecules present in at least one of the selective light modulator layer, in a functional layer external to a surface of the selective light modulator layer, in the selective light modulator layer near an external surface, in the selective light modulator layer near the reflector layer, and in a functional layer external to the reflector layer.

In another aspect, there is disclosed a method for manufacturing an optical device, comprising: depositing on a substrate a reflector layer; depositing on the reflector layer a selective light modulator layer; and providing functional molecules present in at least one of the selective light modulator layer, in a functional layer external to a surface of the selective light modulator layer, in the selective light modulator layer near an external surface, in the selective light modulator layer near the reflector layer, and in a functional layer external to the reflector layer.

In a further aspect, there is disclosed optical devices including a reflector layer; a selective light modulator layer external to the reflector layer; and functional molecules present in at least one of the reflector layer, in a functional layer external to a surface of the reflector layer, in the reflector layer near an external surface, and in the reflector layer near the selective light modulator layer.

In another aspect, there is disclosed a method for manufacturing an optical device, comprising: depositing on a substrate a reflector layer; depositing on the reflector layer a selective light modulator layer; and providing functional molecules present in at least one of the reflector layer, in a functional layer external to a surface of the reflector layer, in the reflector layer near an external surface, and in the reflector layer near the selective light modulator layer.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

DETAILED DESCRIPTION OF THE INVENTION

Throughout this specification and figures like reference numbers identify like elements.

It is to be understood that both the foregoing general description and the following detailed description are exemplary and explanatory only, and are intended to provide an explanation of various embodiments of the present teachings. In its broad and varied embodiments, disclosed herein are articles, such as optical devices, for example, in the form of foils, sheets, and flakes; and a method of manufacturing the article. In an example, the articles including optical devices, such as pigments, optical taggants, and optical security devices can be manufactured with a simplified construction. In particular, functionality can be integrated into layers deposited without a vacuum and without a chemical bath thereby producing little to no waste. Additionally, properties of the article, such as a flake, can be selected. For example, static build-up can be controlled during article processing and during spraying of the article in a paint. As another example, flame retardant additives can be added as a functionality to assist in controlling fire, explosions, or related dangers during article processing.

Figure 1:
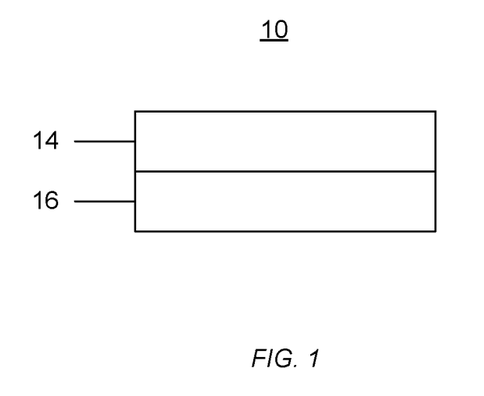
FIG. 1 is a cross-sectional view of an article according to an aspect of the present disclosure.

The articles 10, such as optical devices, in the Figures, such as FIG. 1, can include a reflector layer 16; a selective light modulator layer (SLML) 14 external to the reflector layer 16. In an aspect, functional molecules 12 can be present in at least one of the selective light modulator layer 14, in a functional layer 12 external to a surface of the selective light modulator layer 14, in the selective light modulator layer 14 near an external surface, in the selective light modulator layer 14 near the reflector layer 16, and in a functional layer 12 external to the reflector layer 16. In another aspect, functional molecules 12 can be present in at least one of the reflector layer 16, in a functional layer 12 external to a surface of the reflector layer 16, in the reflector layer 16 near an external surface, and in the reflector layer 16 near the selective light modulator layer 14. The functional molecules 12 can be present as a functional layer 12 or can be present within another layer, such as an SLML 14 layer with functional molecules 12. For ease of reference in the Figures and in the disclosure, if the functional molecules 12 are present as a functional layer 12 then the numeral 12 is used to identify the entire layer. If the functional molecules 12 are present within another layer, they will be represented as circles and identified with the numeral 12.

The functional molecules 12 can provide at least one of the following functions to the article 10, such as an optical device: ease in release from a substrate, compatibility with waterborne and other paint systems, color tuning, durability enhancement, conductivity for controlling static charge, flame retardant property, water permeation control, and other properties beneficial for optical appearance, durability, and safety. The surface energy of the article 10, such as a flake, can be adjusted to be compatible with a paint matrix to optimize a desired optical effect. In addition, the flake orientation within the paint matrix can be controlled angular for maximum flop or in a z-dimension (leafing). Flakes that are asymmetric or symmetric can be oriented in the paint matrix.

As another example, when the functional molecules 12 are present within a functional layer 12 they can be coated on a substrate and used to release an optical stack from the substrate. In this manner, the functional molecules 12 present in the functional layer 12 can be selected to control paint compatibility and can possess hydrophilic, hydrophobic, or both properties. As an example, polyvinyl alcohol can be used a functional molecule 12 because it exhibits both hydrophilic and hydrophobic properties that can be adjusted to release an optical stack from the substrate.

As a further example, when the functional molecules 12 are present within a SLML 14, for example FIGS. 4-9, they can increase electrical conductivity of the article 10, such as an optical device, to reduce static buildup during article processing. The functional molecules 12 can include, but are not limited to, carbon materials, metal nanopowders, ionic liquids, and electrically conductive polymers.

As another example, the functional molecules 12 can provide flame retardant properties to control an explosion risk for fine powders, such as pigment dust, generated during article processing, such as flake sizing, shipping and handling. In particular, flakes can electrostatically stick to equipment and any static charge on the articles during processing can generate sparks that could cause a fire or explosion. The functional molecules 12 can assist in dissipating the static charge as well as providing improved adhesion with a metal reflector layer 16. The functional molecules 12 can include, but are not limited to, halogen additives and siloxanes. As an example, a functional molecule 12 containing both an acrylate functional group and a phosphoric acid group can participate in crosslinking of resins while the phosphoric acid group can bind strongly to oxides of a metal surface, such as the reflector layer 16. Additionally, the phosphoric acid group can enable electric charges on the article 10 to dissipate across the article 10 surface or through the bulk of the article 10 to the reflector layer 16 and eventually to a ground.

Figure 2:
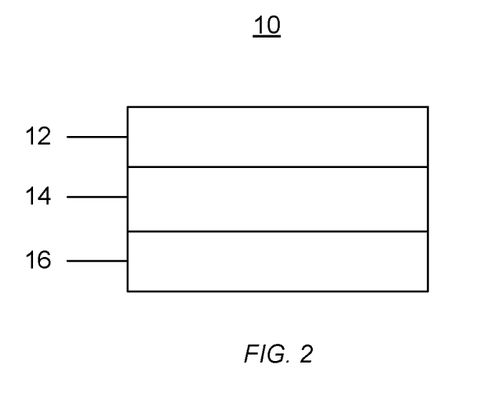
FIG. 2 is a cross-sectional view of an article according to another aspect of the present disclosure.
Figure 3:
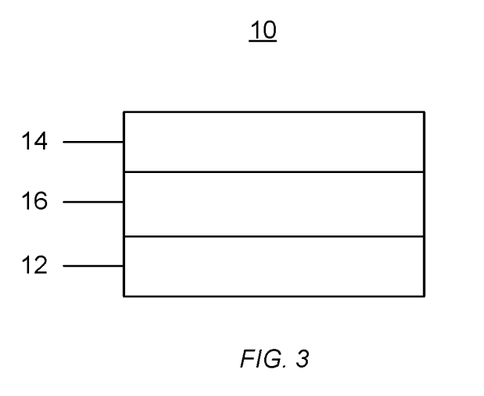
FIG. 3 is a cross-sectional view of an article according to another aspect of the present disclosure.
Figure 10:
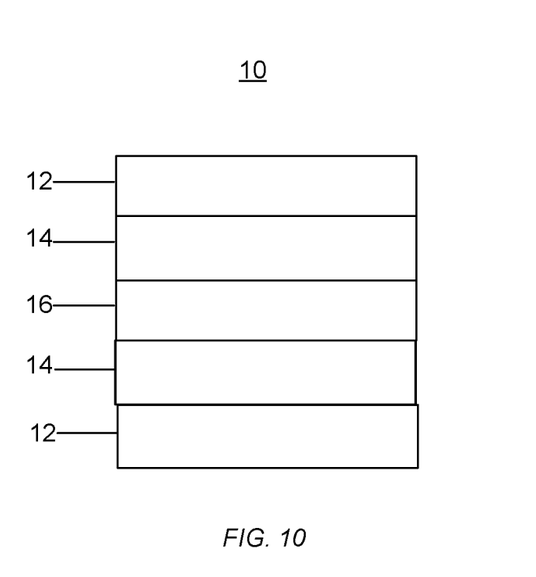
FIG. 10 is a cross-sectional view of an article according to another aspect of the present disclosure.

When the article 10 includes a functional layer 12, such as FIGS. 2, 3, and 10, then the functional layer 12 can have a thickness ranging from about 5 nm to about 200 nm, for example, from about 10 nm to about 180 nm, and as a further example, from about 15 nm to about 160 nm, depending upon the composition of the functional layer 12. The functional layer 12 should not diminish an optical property of the selective light modulator layer 14. The functional layer 12 can be coated at a thickness, or can contain suitable materials, to provide a specific optical effect. For example, the functional layer 12 can include a higher refractive index nanoparticle, which can also assist in releasing the article from a substrate used in a coating process.

As illustrated in FIG. 2, the article 10 can include a reflector layer 16, a selective light modulator layer 14 external to the reflector layer 16, and functional molecules 12 that are present in a functional layer 12 external to a surface of the selective light modulator layer 14. As illustrated in FIG. 3, the article 10 can include a reflector layer 16, a selective light modulator layer 14 external to the reflector layer 16, and functional molecules 12 that are present in a functional layer 12 external to the reflector layer 16.

Figure 4:
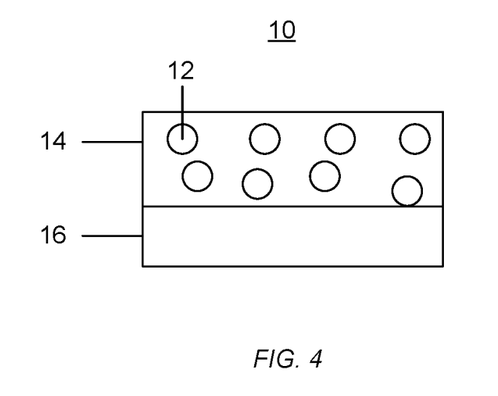
FIG. 4 is a cross-sectional view of an article according to another aspect of the present disclosure.
Figure 5:
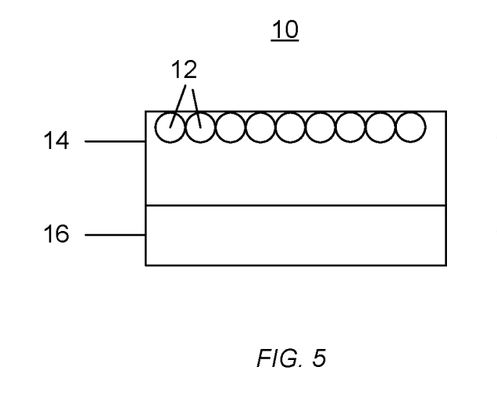
FIG. 5 is a cross-sectional view of an article according to another aspect of the present disclosure.
Figure 6:
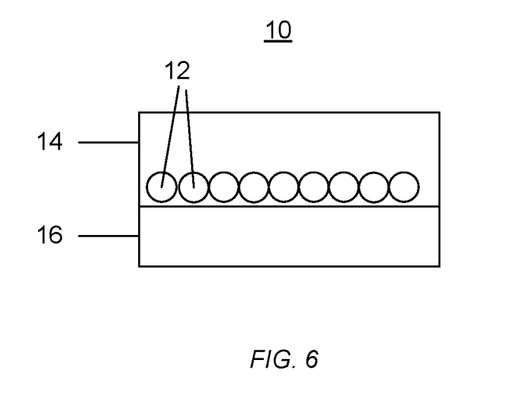
FIG. 6 is a cross-sectional view of an article according to another aspect of the present disclosure.

As illustrated in FIG. 4, the article 10 can include a reflector layer 16, a selective light modulator layer 14 external to the reflector layer 16, and functional molecules 12 that are present in the selective light modulator layer 14. In particular, the functional molecules 12 can be present, i.e., can be diffused, throughout the selective light modulator layer 14. The functional molecules 12 can move from a diffused state, as shown in FIG. 4, to an aligned state, as shown in FIGS. 5 and 6. The change from a diffused stated to an aligned state can happen over time or can be selected based upon the physical properties of the functional molecules 12, the drying process, and/or the curing process. As illustrated in FIG. 5, the article 10 can include a reflector layer 16, a selective light modulator layer 14 external to the reflector layer 16, and functional molecules 12 present in the selective light modulator layer 14 near an external surface. As illustrated in FIG. 6, the article 10 can include a reflector layer 16, a selective light modulator layer 14 external to the reflector layer 16, and functional molecules 12 present in the selective light modulator layer 14 near the reflector layer 16.

Figure 7:
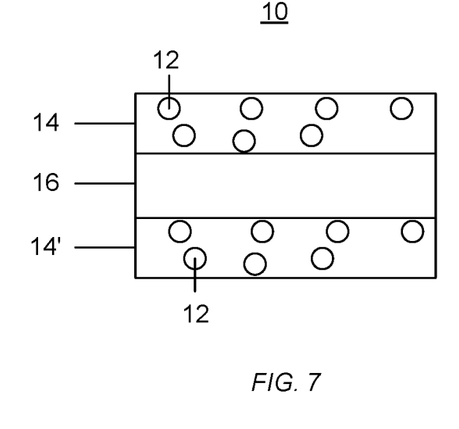
FIG. 7 is a cross-sectional view of an article according to another aspect of the present disclosure.
Figure 8:
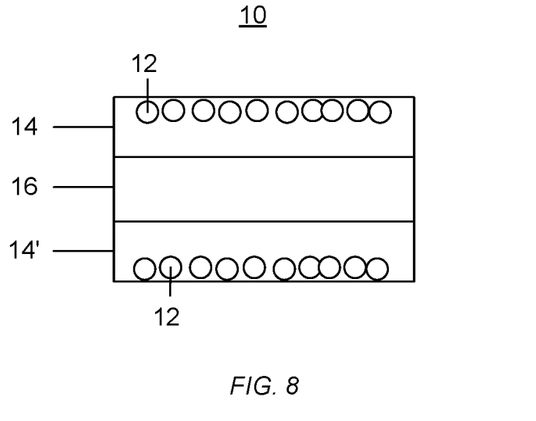
FIG. 8 is a cross-sectional view of an article according to another aspect of the present disclosure.
Figure 9:
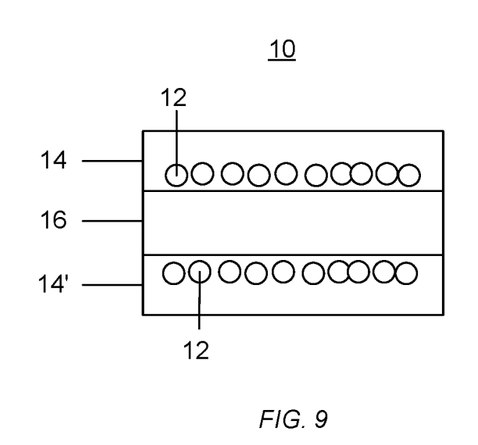
FIG. 9 is a cross-sectional view of an article according to another aspect of the present disclosure.

The article 10 can include a reflector layer 16 having a first surface and a second surface opposite the first surface. The article 10 can include a selective light modulator layer 14 that is a first selective light modulator layer 14 and is external to the first surface of the reflector layer 16. The article 10 can also include a second selective light modulator layer 14' that is external to the second surface of the reflector layer 16, as shown in FIG. 7. Functional molecules 12 can be present in at least one of the first selective light modulator layer 14 and the second selective light modulator layer 14'. The functional molecules 12 can move from a diffused state, as shown in FIG. 7, to an aligned state, as shown in FIGS. 8 and 9. As illustrated in FIG. 8, the article 10 can include a reflector layer 16 having a first surface and a second surface opposite the first surface; a first selective light modulator layer 14 external to the first surface of the reflector layer 16; a second selective light modulator layer 14' external to the second surface of the reflector layer 16; and functional molecules 12 present in at least one of the first selective light modulator layer 14 and the second selective light modulator layer 14' near an external surface of the at least one first selective light modulator layer 14 and second selective light modulator layer 14'. As illustrated in FIG. 9, the article 10 can include a reflector layer 16 having a first surface and a second surface opposite the first surface; a first selective light modulator layer 14 external to the first surface of the reflector layer 16; a second selective light modulator layer 14' external to the second surface of the reflector layer 16; and functional molecules 12 present in at least one of the first selective light modulator layer 14 and the second selective light modulator layer 14' near the reflector layer 16. The first selective light modulator layer 14 can be the same or different from the second selective light modulator layer 14'.

As illustrated in FIG. 10, the article 10 can include a reflector layer 16 having a first surface and a second surface opposite the first surface; a first selective light modulator layer 14 external to the first surface of the reflector layer 16; a second selective light modulator layer 14' external to the second surface of the reflector layer 16; and functional molecules 12 that are present in at least one functional layer 12, 12' external to a surface of at least one of the first selective light modulator layer 14 and the second selective light modulator layer 14'. The first selective light modulator layer 14 can be the same or different from the second selective light modulator layer 14'. The functional layer 12, 12' can be the same or different from each other.

FIGS. 11-16 illustrate an article 10 including a non-metal reflector layer 16 that has been non-vacuum deposited. Any non-metal material can be used in the reflector layer 16. Examples of non-metal materials are disclosed further herein. Any non-vacuum deposition process can be used including, but not limited to, sputtering deposition; evaporation deposition; plasma deposition; sol-gel deposition; spin coating; dip coating; and a liquid coating process, such as a slot die deposition process.

Figure 11:
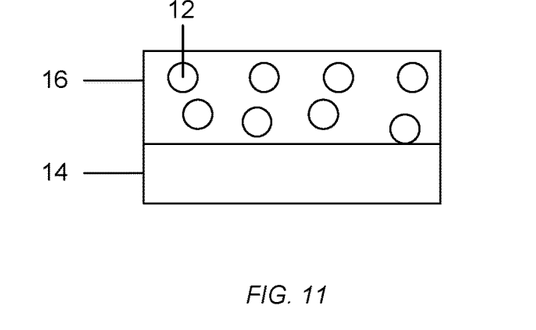
FIG. 11 is a cross-sectional view of an article according to another aspect of the present disclosure.
Figure 12:
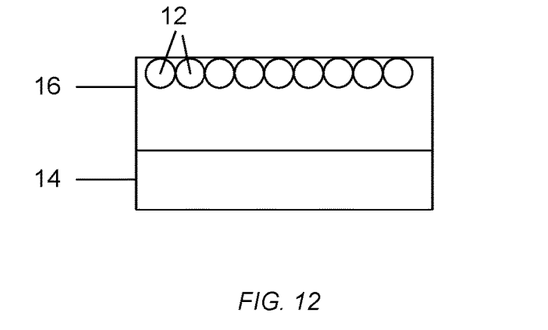
FIG. 12 is a cross-sectional view of an article according to another aspect of the present disclosure.
Figure 13:
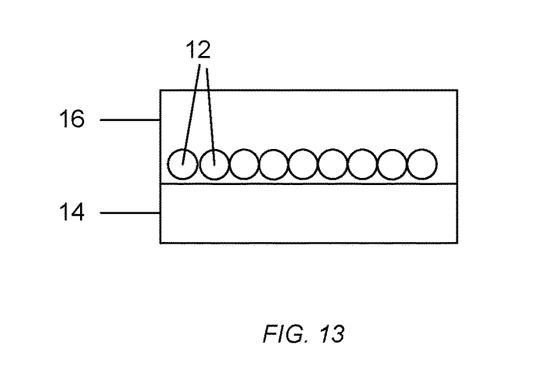
FIG. 13 is a cross-sectional view of an article according to another aspect of the present disclosure.

As illustrated in FIG. 11, the article 10 can include a reflector layer 16, a selective light modulator layer 14 external to the reflector layer 16, and functional molecules 12 that are present in the reflector layer 16. In particular, the functional molecules 12 can be present, i.e., can be diffused, throughout the reflector layer 16. The functional molecules 12 can move from a diffused state, as shown in FIG. 11, to an aligned state, as shown in FIGS. 12 and 13. The change from a diffused stated to an aligned state can happen over time or can be selected based upon the physical properties of the functional molecules 12, the drying process, and/or the curing process. As illustrated in FIG. 12, the article 10 can include a reflector layer 16, a selective light modulator layer 14 external to the reflector layer 16, and functional molecules 12 present in the reflector layer 16 near an external surface. As illustrated in FIG. 13, the article 10 can include a reflector layer 16, a selective light modulator layer 14 external to the reflector layer 16, and functional molecules 12 present in the reflector layer 16 near the selective light modulator layer 14.

Figure 14:
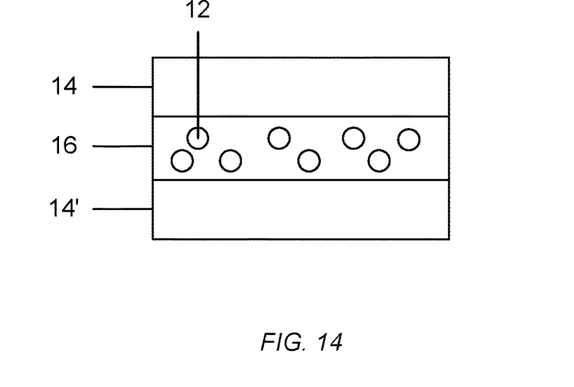
FIG. 14 is a cross-sectional view of an article according to another aspect of the present disclosure.
Figure 15:
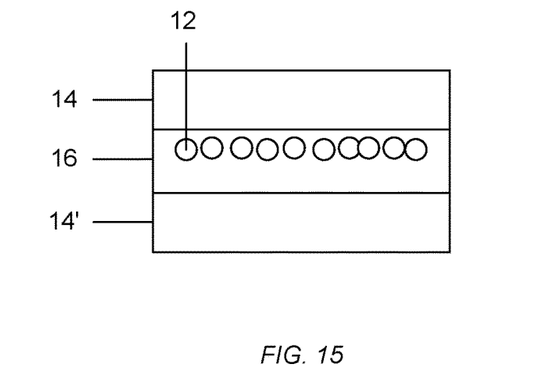
FIG. 15 is a cross-sectional view of an article according to another aspect of the present disclosure.

The article 10 can include a reflector layer 16 having a first surface and a second surface opposite the first surface. The article 10 can include a selective light modulator layer 14 that is a first selective light modulator layer 14 and is external to the first surface of the reflector layer 16. The article 10 can also include a second selective light modulator layer 14' that is external to the second surface of the reflector layer 16, as shown in FIG. 14. Functional molecules 12 can be present in the reflector layer 16, in a manner similar to the article 10 in FIG. 7. As illustrated in FIG. 15, the article 10 can include a reflector layer 16 having a first surface and a second surface opposite the first surface; a first selective light modulator layer 14 external to the first surface of the reflector layer 16; a second selective light modulator layer 14' external to the second surface of the reflector layer 16; and functional molecules 12 present in a functional layer near the first selective light modulator layer 14. In another aspect, the functional molecules can be present in a functional layer near the second selective light modulator layer 14'.

Figure 16:
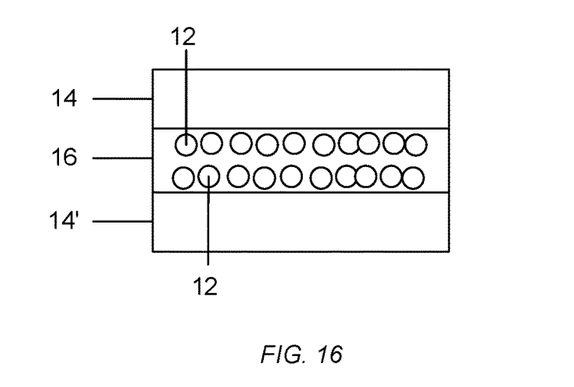
FIG. 16 is a cross-sectional view of an article according to another aspect of the present disclosure.
Figure 17:
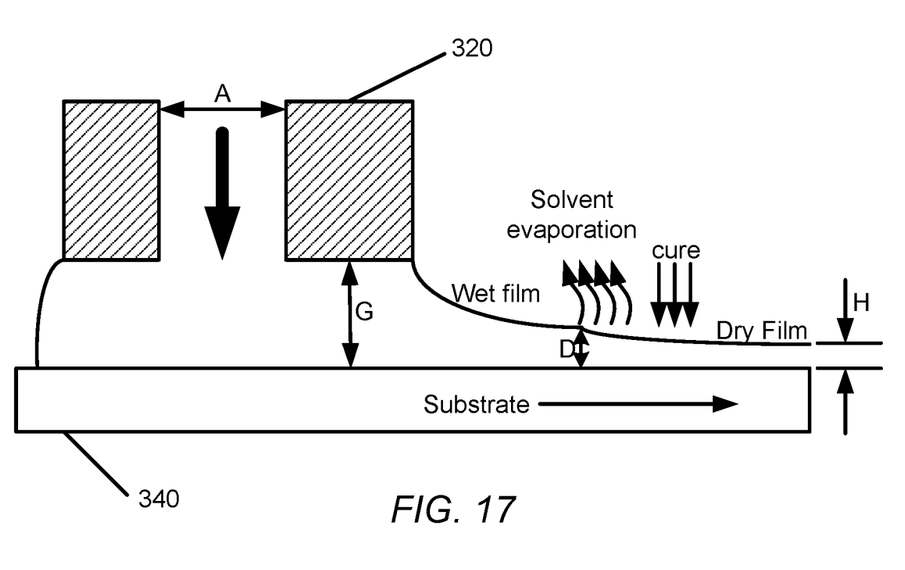
FIG. 17 is a cross sectional view of a liquid coating process showing deposition of a layer, such as an SLML layer, according to an example of the present disclosure.

As illustrated in FIG. 16, the article 10 can include a reflector layer 16 having a first surface and a second surface opposite the first surface; a first selective light modulator layer 14 external to the first surface of the reflector layer 16; a second selective light modulator layer 14' external to the second surface of the reflector layer 16; and functional molecules 12 present in a functional layer near at least one of, such as both of, the first selective light modulator layer 14 and the second selective light modulator layer 14'. The first selective light modulator layer 14 can be the same or different from the second selective light modulator layer 14'.

The articles 10 illustrated in the Figures can include functional molecules 12 including at least one group chosen from electric charge dissipation groups; coating bonding groups; and adhesion enhancing groups. The electric charge dissipation groups can include, but are not limited to, amines, polyols, phosphoric acid, amides, quaternary ammonium salts, pyridinum salts, polyethylene glycols, phenols, carbon blacks, conductive metal particles, carbon nanotubes, indium oxide, conductive polymers, sulfonic acids, and combinations thereof. The coating bonding groups can include, but are not limited to, acrylate, methacrylate, vinyl, epoxy, urethane, polyols, amines, phenols, carboxylic acids, amides, thiols, and combinations thereof. The adhesion enhancing groups can include, but are not limited to, siloxanes, amines, polyols, polycarboxylic acids, phosphoric acids, sulfonic acids, amines, anhydrides, acyl halides, and combinations thereof. It will be noted that a functional molecule 12 can include a functional group having more than one function. For example, phosphoric acids, amines, carboxylic acids, polyols, and amides can bond to a metal surface and dissipate electric charge.

The functional molecules for use in the disclosed articles 10 can be the same or different. For example, the functional molecules 12 can include a variety of different molecules in order to provide a variety of different functions to the article. In an aspect, for example, when the functional molecules 12 are present in a layer or are aligned they may be the same type of functional molecule 12 from those disclosed above. In another aspect, for example, when the functional molecules 12 are present in a layer in a diffused state they may be different types of functional molecules. In a further aspect, the functional molecules 12 may be the same in a given layer but may be different in a second or different layer.

In an aspect, the article 10 can be in a form of a sheet that can be used on an object or a substrate. In another aspect, the article 10 can be in a form of a foil or flake. For example, the article 10 can have a lamellar shape. In an aspect, an optical device can include an article 10. In another aspect, a composition can include the optical device and a liquid medium. The composition can be an ink, a varnish, a paint, etc. In another aspect, the article 10 is an optical device in the form of a flake, for example having 100 nm to 100 μm in thickness and 100 nm to 1 mm in size. The article 10 can be a color shifting colorant, or can be used as a security feature for currency. Some attributes common to use of the article 10 can include high chromaticity (or strong color), color change with respect to viewing angle (also known as goniochromaticity or iridescence), and flop (a specular and metallic appearance that varies in lightness, hue, or chromaticity as the viewing angle varies). Additionally, the article 10 can be metallic in color and cannot exploit interference to generate color.

Although the Figures illustrate an article 10, such as an optical device, in the form of a sheet, the article 10, such as an optical device can also be in a form of a flake, and/or a foil, according to various aspects of the present disclosure. Additionally, although the Figures illustrate specific layers in specific orders, one of ordinary skill in the art would appreciate that the article 10 can include any number of layers in any order. Additionally, the composition of any particular layer can be the same or different from the composition of any other layer. For example, a first selective light modulator layer (SLML) 14 can be the same or different composition than a second selective light modulator layer (SLML) 14'. Further, the physical properties of any particular layer can be the same or different from the physical properties of any other layer. For example, a first SLML 14 can have a composition with a first refractive index, but a second SLML 14' in the same article 10 can have a different composition with a different refractive index. As another example, a first SLML 14 can have a composition at a first thickness, but the second SLML 14' can have the same composition at a second thickness different from the first thickness.

A reflector layer 16 can be a wideband reflector, e.g., spectral and Lambertian reflector (e.g., white TiO$_2$). Reflector 16 can be a metal, non-metal, or metal alloy. In one example, the materials for the reflector layer 16 can include any materials that have reflective characteristics in the desired spectral range. For example, any material with a reflectance ranging from 5% to 100% in the desired spectral range. An example of a reflective material can be aluminum, which has good reflectance characteristics, is inexpensive, and is easy to form into or deposit as a thin layer. Other reflective materials can also be used in place of aluminum. For example, copper, silver, gold, platinum, palladium, nickel, cobalt, niobium, chromium, tin, and combinations or alloys of these or other metals can be used as reflective materials. In an aspect, the material for the reflector 16 can be a white or light colored metal. In other examples, reflector 16 can include, but is not limited to, the transition and lanthanide metals and combinations thereof; as well as metal carbides, metal oxides, metal nitrides, metal sulfides, a combination thereof, or mixtures of metals and one or more of these materials. As discussed above, some articles 10 can include a non-metal reflector layer 16 that has been non-vacuum deposited and can include functional molecules 12.

The thickness of the reflector 16 can range from about 5 nm to about 5000 nm, although this range should not be taken as restrictive. For example, the lower thickness limit can be selected so that reflector 16 can provide a maximum transmittance of 0.8. Additionally, or alternatively, for a reflector 16 including aluminum the optical density (OD) can be from about 0.1 to about 4 at a wavelength of about 550 nm.

In order to obtain a sufficient optical density and/or achieve a desired effect, a higher or lower minimum thicknesses can be required depending of the composition of reflector layer 16. In some examples, the upper limit can be about 5000 nm, about 4000 nm, about 3000 nm, about 1500 nm, about 200 nm, and/or about 100 nm. In one aspect, the thickness of the reflector layer 16 can range from about 10 nm to about 5000 nm for example, from about 15 nm to about 4000 nm, from about 20 nm to about 3000 nm, from about 25 nm to about 2000 nm, from about 30 nm to about 1000 nm, from about 40 nm to about 750 nm, or from about 50 nm to about 500 nm, such as from about 60 nm to about 250 nm or from about 70 nm to about 200 nm.

As shown in the Figures, at least two surfaces/sides of reflector layer 16, for example, the right (third) and left (fourth) surface/side as shown, can be open. In an aspect, if the article 10 is in the form of a flake or foil, then reflector layer 16 can include more than the four surfaces exemplified in the Figures. In those instances, for example, one, two, three, four, or five surfaces of reflector 16 can be open to the air. In an example, open sides, i.e., surfaces of the reflector 16 that do not contain an external layer, can be an advantage for flop.

Referring back to FIG. 1, the article 10 can include a first selective light modulator layer (SLML) 14 external to the first surface of the reflector layer 16. The SLML is a physical layer comprising a plurality of optical functions aiming at modulating (absorbing and or emitting) light intensity in different, selected regions of spectrum of electromagnetic radiation with wavelengths ranging from about 0.2 μm to about 20 μm. The article 10 of FIG. 1 includes an asymmetric layer structure in which the SLML 14 can selectively modulate light by means of absorption provided by a selective SLMS (discussed in more detail below). In particular, the article 10 can include a SLML 14 that selectively absorbs specific wavelengths of energy, such as light.

A SLML 14 (and/or the materials within the SLML 14) can selectively modulate light. For example, an SLML 14 can control the amount of transmission in specific wavelengths. In some examples, the SLML 14 can selectively absorb specific wavelengths of energy (e.g., in the visible and/or non-visible ranges). For example, the SLML 14 can be a "colored layer" and/or a "wavelength selective absorbing layer." In some examples, the specific wavelengths absorbed can cause the article 10 to appear a specific color. For example, the SLML 14 can appear red to the human eye (e.g., the SLML 14 can absorb wavelengths of light below approximately 620 nm and thus reflect or transmit wavelengths of energy that appear red). This can be accomplished by adding selective light modulator particles (SLMP) that are colorants (e.g., organic and/or inorganic pigments and/or dyes) to a host material, such as a dielectric material, including but not limited to a polymer. For example, in some instances, the SLML 14 can be a colored plastic.

In some examples, some or all of the specific wavelengths absorbed can be in the visible range (e.g., the SLML 14 can be absorbing throughout the visible, but transparent in the infrared). The resulting article 10 would appear black, but reflect light in the infrared. In some examples described above, the wavelengths absorbed (and/or the specific visible color) of the article 10 and/or SLML 14 can depend, at least in part, on the thickness of the SLML 14. Additionally, or alternatively, the wavelengths of energy absorbed by the SLML 14 (and/or the color in which these layers and/or the flake appears) can depend in part on the addition of certain aspects to the SLML 14. In addition to absorbing certain wavelengths of energy, the SLML 14 can achieve at least one of bolstering the reflector layer 16 against degradation; enabling release from a substrate; enabling sizing; providing some resistance to environmental degradation, such as oxidation of aluminum or other metals and materials used in the reflector layer 16; and high performance in transmission, reflection, and absorption of light based upon the composition and thickness of the SLML 14.

In some examples, in addition to or as an alternative to the SLML 14 selectively absorbing specific wavelengths of energy and/or wavelengths of visible light, the SLML 14 of the article 10 can control the refractive index and/or the SLML 14 can include selective light modulator particles (SLMPs) that can control refractive index. SLMPs that can control the refractive index of the SLML 14 can be included with the host material in addition to or as an alternative to an absorption controlling SLMPs (e.g., colorants). In some examples, the host material can be combined with both absorption controlling SLMPs and refractive index SLMPs in the SLML 14. In some examples, the same SLMP can control both absorption and refractive index.

The performance of the SLML 14 can be determined based upon the selection of materials present in the SLML 14. In an aspect, the SLML 14 can improve at least one of the following properties: flake handling, corrosion, alignment, and environmental performance of any other layers within article 10, e.g., the reflector layer 16.

The first and (optionally second, third, fourth, etc.) SLML 14 can each independently comprise a host material alone, or a host material combined with a selective light modulator system (SLMS). In an aspect, at least one of the first SLML 14 can include a host material. In another aspect, at least one of the first SLML 14 can include a host material and a SLMS. The SLMS can include a selective light modulator molecule (SLMM), a selective light modulator particle (SLMP), an additive, or combinations thereof.

The composition of the SLML 14 can have a solids content ranging from about 0.01% to about 100%, for example from about 0.05% to about 80%, and as a further example from about 1% to about 30%. In some aspects, the solids content can be greater than 3%. In some aspects, the composition of the SLML 14 can have a solids content ranging from about 3% to about 100%, for example from about 4% to 50%.

The host material of the first SLML 14 can independently be a film forming material applied as a coating liquid and serving optical and structural purposes. The host material can be used as a host (matrix) for introducing, if necessary, a guest system, such as the selective light modulator system (SLMS), for providing additional light modulator properties to the article 10.

The host material can be a dielectric material. Additionally, or alternatively, the host material can be at least one of an organic polymer, an inorganic polymer, and a composite material. Non-limiting examples of the organic polymer include thermoplastics, such as polyesters, polyolefins, polycarbonates, polyamides, polyimides, polyurethanes, acrylics, acrylates, polyvinylesters, polyethers, polythiols, silicones, fluorocarbons, and various co-polymers thereof; thermosets, such as epoxies, polyurethanes, acrylates, melamine formaldehyde, urea formaldehyde, and phenol formaldehyde; and energy curable materials, such as acrylates, epoxies, vinyls, vinyl esters, styrenes, and silanes. Non-limiting examples of inorganic polymers includes silanes, siloxanes, titanates, zirconates, aluminates, silicates, phosphazanes, polyborazylenes, and polythiazyls.

The first SLML 14 can include from about 0.001% to about 100% by weight of a host material. In an aspect, the host material can be present in the SLML 14 in an amount ranging from about 0.01% to about 95% by weight, for example from about 0.1% to about 90%, and as a further example from about 1% to about 87% by weight of the SLML 14.

The SLMS, for use in the SLML 14 with the host material, can each independently comprise selective light modulator particles (SLMP), selective light modulator molecules (SLMM), additives, or a combination thereof. The SLMS can also comprise other materials. The SLMS can provide modulation of the amplitude of electromagnetic radiation (by absorption, reflectance, fluorescence etc.) in a selective region or the entire spectral range of interest (0.2 µm to 20 µm).

The first SLML 14 can each independently include in an SLMS a SLMP. The SLMP can be any particle combined with the host material to selectively control light modulation, including, but not limited to color shifting particles, dyes, colorants including one or more of dyes, pigments, reflective pigments, color shifting pigments, quantum dots, and selective reflectors. Non-limiting examples of a SLMP include: organic pigments, inorganic pigments, quantum dots, nanoparticles (selectively reflecting and/or absorbing), micelles, etc. The nanoparticles can include, but are not limited to organic and metalorganic materials having a high value of refractive index (n>1.6 at wavelength of about 550 nm); metal oxides, such as $TiO_2$, $ZrO_2$, $In_2O_3$, $In_2O_3$—SnO, $SnO_2$, $Fe_xO_y$ (wherein x and y are each independently integers greater than 0), and $WO_3$; metal sulfides, such as ZnS, and $Cu_xS_y$ (wherein x and y are each independently integers greater than 0); chalcogenides, quantum dots, metal nanoparticles; carbonates; fluorides; and mixtures thereof.

Examples of a SLMM include but are not limited to: organic dyes, inorganic dyes, micelles, and other molecular systems containing a chromophore.

In some aspects, SLMS of the first SLML 14 can include at least one additive, such as a curing agent, and a coating aid.

The curing agent can be a compound or material that can initiate hardening, vitrification, crosslinking, or polymerizing of the host material. Non-limiting examples of a curing agent include solvents, radical generators (by energy or chemical), acid generators (by energy or chemical), condensation initiators, and acid/base catalysts.

Non-limiting examples of the coating aid include leveling agents, wetting agents, defoamers, adhesion promoters, antioxidants, UV stabilizers, curing inhibition mitigating agents, antifouling agents, corrosion inhibitors, photosensitizers, secondary crosslinkers, and infrared absorbers for enhanced infrared drying. In an aspect, the antioxidant can be present in the composition of the SLML 14 in an amount ranging from about 25 ppm to about 5% by weight.

The SLML 14 can each independently comprise a solvent. Non-limiting examples of solvents can include acetates, such as ethyl acetate, propyl acetate, and butyl acetate; acetone; water; ketones, such as dimethyl ketone (DMK), methylethyl ketone (MEK), secbutyl methyl ketone (SBMK), ter-butyl methyl ketone (TBMK), cyclopentanone, and anisole; glycol and glycol derivatives, such as propylene glycol methyl ether, and propylene glycol methyl ether acetate; alcohols, such as isopropyl alcohol, and diacetone alcohol; esters, such as malonates; heterocyclic solvents, such as n-methyl pyrrolidone; hydrocarbons, such as toluene, and xylene; coalescing solvents, such as glycol ethers; and mixtures thereof. In an aspect, the solvent can be present in the first SLML 14' in an amount ranging from about 0% to about 99.9%, for example from about 0.005% to about 99%, and as a further example from about 0.05% to about 90% by weight relative to the total weight of the SLML 14.

In some examples, the first SLML 14 can include a composition having at least one of (i) a photoinitiator, (ii) an oxygen inhibition mitigation composition, (iii) a leveling agent, and (iv) a defoamer.

The oxygen inhibition mitigation composition can be used to mitigate the oxygen inhibition of the free radical material. The molecular oxygen can quench the triplet state of a photoinitiator sensitizer or it can scavenge the free radicals resulting in reduced coating properties and/or uncured liquid surfaces. The oxygen inhibition mitigation composition can reduce the oxygen inhibition or can improve the cure of any SLML 14.

The oxygen inhibition composition can comprise more than one compound. The oxygen inhibition mitigation composition can comprise at least one acrylate, for example at least one acrylate monomer and at least one acrylate oligomer. In an aspect, the oxygen inhibition mitigation composition can comprise at least one acrylate monomer and two acrylate oligomers. Non-limiting examples of an acrylate for use in the oxygen inhibition mitigation composition can include acrylates; methacrylates; epoxy acrylates, such as modified epoxy acrylate; polyester acrylates, such as acid functional polyester acrylates, tetra functional polyester acrylates, modified polyester acrylates, and bio-sourced polyester acrylates; polyether acrylates, such as amine modified polyether acrylates including amine functional acrylate co-initiators and tertiary amine co-initiators; urethane acrylates, such aromatic urethane acrylates, modified aliphatic urethane acrylates, aliphatic urethane acrylates, and aliphatic allophanate based urethane acrylates; and monomers and oligomers thereof. In an aspect, the oxygen inhibition mitigation composition can include at least one acrylate oligomer, such as two oligomers. The at least one acrylate oligomer can be selected/chosen from a polyester acrylate and a polyether acrylate, such as a mercapto modified polyester acrylate and an amine modified polyether tetraacrylate. The oxygen inhibition mitigation composition can also include at least one monomer, such as 1,6-hexanediol diacrylate. The oxygen inhibition mitigation composition can be present in the first SLML 14 in an amount ranging from about 5% to about 95%, for example from about 10% to about 90%, and as a further example from about 15% to about 85% by weight relative to the total weight of the SLML 14.

In some examples, the host material of the SLML 14 can use a non-radical cure system such as a cationic system. Cationic systems are less susceptible to the mitigation of the oxygen inhibition of the free radical process, and thus may not require an oxygen inhibition mitigation composition. In an example, the use of the monomer 3-ethyl-3-hydroxymethyloxetane does not require an oxygen mitigation composition.

In an aspect, the first SLML 14 can each independently include at least one photoinitiator, such as two photoinitiators, or three photoinitiators. The photoinitiator can be used for shorter wavelengths. The photoinitiator can be active for actinic wavelength. The photoinitiator can be a Type 1 photoinitiator or a Type II photoinitiator. The SLML 14 can include only Type I photoinitiators, only Type II photoinitiators, or a combination of both Type I and Type II photoinitiators. The photoinitiator can be present in the composition of the SLML 14 in an amount ranging from about 0.25% to about 15%, for example from about 0.5% to about 10%, and as a further example from about 1% to about 5% by weight relative to the total weight of the composition of the SLML 14.

The photoinitiator can be a phosphineoxide. The phosphineoxide can include, but is not limited to, a monoacyl phosphineoxide and a bis acyl phosphine oxide. The mono acyl phosphine oxide can be a diphenyl (2,4,6-trimethylbenzoyl)phosphineoxide. The bis acyl phosphine oxide can be a bis (2,4,6-trimethylbenzoyl)phenylphosphineoxide. In an aspect, at least one phosphineoxide can be present in the composition of the SLML 14. For example, two phosphineoxides can be present in the composition of the SLML 14.

A sensitizer can be present in the composition of the SLML 14 and can act as a sensitizer for Type 1 and/or a Type II photoinitiators. The sensitizer can also act as a Type II photoinitiator. In an aspect, the sensitizer can be present in the composition of the SLML 14 in an amount ranging from about 0.05% to about 10%, for example from about 0.1% to about 7%, and as a further example from about 1% to about 5% by weight relative to the total weight of the composition of the SLML 14. The sensitizer can be a thioxanthone, such as 1-chloro-4-propoxythioxanthone.

In an aspect, the SLML 14 can include a leveling agent. The leveling agent can be a polyacrylate. The leveling agent can eliminate cratering of the composition of the SLML 14. The leveling agent can be present in the composition of the SLML 14 in an amount ranging from about 0.05% to about 10%, for example from about 1% to about 7%, and as a further example from about 2% to about 5% by weight relative to the total weight of the composition of the SLML 14.

The first SLML 14 can also include a defoamer. The defoamer can reduce surface tension. The defoamer can be a silicone free liquid organic polymer. The defoamer can be present in the composition of the SLML 14 in an amount ranging from about 0.05% to about 5%, for example from about 0.2% to about 4%, and as a further example from about 0.4% to about 3% by weight relative to the total weight of the composition of the SLML 14.

The first SLML 14 can each independently have a refractive index of greater or less than about 1.5. For example, each SLML 14' can have a refractive index of approximately 1.5. The refractive index of each SLML 14 can be selected to provide a degree of color travel required wherein color travel can be defined as the change in hue angle measured in L*a*b* color space with the viewing angle. In some examples, each SLML 14 can include a refractive index in a range of from about 1.1 to about 3.0, about 1.0 to about 1.3, or about 1.1 to about 1.2. In some examples, the refractive index of each SLMLs 14 can be less than about 1.5, less than about 1.3, or less than about 1.2. In some examples, SLML 14 can have substantially equal refractive indexes or different refractive indexes one from the other, if more than one SLML is present in the article 10.

The first SLML 14 can have a thickness ranging from about 1 nm to about 10000 nm, about 10 nm to about 1000 nm, about 20 nm to about 500 nm, about 1 nm, to about 100 nm, about 10 nm to about 1000 nm, about 1 nm to about 5000 nm. In an aspect, the article 10, such as an optical device, can have an aspect ratio of 1:1 to 1:50 thickness to width.

In an example, the SLML 14 can include an alicyclic epoxy resin host using a diketopyrrolopyrrole insoluble red dye as the SLMP, the reflector 16 can include aluminum.

In an example, the SLML 14 can include an acrylate oligomer resin host using white pigment (Titania) as the SLMP.

In an example, the SLML 14 can include an acrylate oligomer resin host using black IR transparent pigment as the SLML, the reflector layer 16 can include aluminum.

One of the benefits of the articles 10 described herein, however, is that, in some examples, the optical effects appear relatively insensitive to thickness variations. Thus, in some aspects, each SLML 14 can independently have a variation in optical thickness of less than about 5%. In an aspect, each SLML 14 can independently include an optical thickness variation of less than about 3% across the layer. In an aspect, each SLML 14 can independently have less than about 1% variation in optical thickness across the layer having a thickness ranging from about 50 nm to about 1000 nm, for example about 500 nm.

In an aspect, the article 10, such as an optical device in the form of a flake, foil or sheet, can also include a substrate and/or a release layer. In an aspect, the release layer can be disposed between the substrate and the article 10.

Additionally, or alternatively, the article 10 in the form of a flake, sheet, or foil can also include a hard coat or protective layer on the article 10. In some examples, these layers (hard coat or protective layer) do not require optical qualities.

The article 10, such as optical devices, described herein can be made in any way. For example, a sheet can be made and then divided, broken, ground, etc. into smaller pieces forming an optical device. In some examples, the sheet can be created by a liquid coating process, including, but not limited the processes described below and/or with respect to FIG. 11.

There is disclosed a method for manufacturing an article 10, for example in the form of a sheet, flake, or foil, as described herein. The method can comprise depositing on a substrate a reflector layer 16; depositing on the reflector layer 16 a first selective light modulator layer 14; and providing functional molecules 12 in at least one of the selective light modulator layer 14, in a functional layer 12 external to a surface of the selective light modulator layer 14, in the selective light modulator layer 14 near an external surface, in the selective light modulator layer 14 near the reflector layer 16, and in a functional layer 12 external to the reflector layer 16. The functional molecules 12 can be provided in a functional layer 12 external to a surface of the first selective light modulator layer 14. In another aspect, the functional molecules 12 can be provided in a functional layer 12 external to the reflector layer 16. In a further aspect, the functional molecules 12 can be provided in the selective light modulator layer 14, for example, diffused throughout, near an external surface of the selective light modulator layer 14, or near the reflector layer 16.

There is also disclosed a method for manufacturing an article 10, for example in the form of a sheet, flake, or foil, as described herein. The method can comprise depositing on a substrate a reflector layer 16; depositing on the reflector layer 16 a first selective light modulator layer 14; and providing functional molecules 12 in at least one of the reflector layer 16, in a functional layer 12 external to a surface of the reflector layer 16, in the reflector layer 16 near an external surface, and in the reflector layer 16 near the selective light modulator layer 14. The functional molecules 12 can be provided in the reflector layer 16. In another aspect, the functional molecules 12 can be provided in a functional layer 12 external to a surface of the reflector layer 16. In a further aspect, the functional molecules 12 can be provided in the reflector layer 16 near an external surface. In another aspect, the functional molecules can be present in the reflector layer 16 near the selective light modulator layer 14.

In the methods, the substrate can comprise a release layer. In the disclosed methods, the reflector layer 16 can be deposited using known conventional deposition process, such as physical vapor deposition, chemical vapor deposition, thin-film deposition, atomic layer deposition, etc., including modified techniques such as plasma enhanced and fluidized bed. In the disclosed methods, the reflector layer 16 can be deposited using known conventional deposition processes that do not utilize a vacuum, such as non-vacuum deposition processes, including those disclosed herein, including a liquid coating process.

The substrate can be made of a flexible material. The substrate can be any suitable material that can receive the deposited layers. Non-limiting examples of suitable substrate materials include polymer web, such as polyethylene terephthalate (PET), glass foil, glass sheets, polymeric foils, polymeric sheets, metal foils, metal sheets, ceramic foils, ceramic sheets, ionic liquid, paper, silicon wafers, etc. The substrate can vary in thickness, but can range for example from about 2 μm to about 100 μm, and as a further example from about 10 to about 50 μm.

The first and/or second SLML 14, 14' and/or the functional molecules 12 present within the SLML 14 and/or the functional molecules within a functional layer 12, and/or the reflector layer 16, and/or the functional molecules 12 present within the reflector layer 16 can be deposited by a liquid coating process, such as a slot die process. The liquid coating process can include, but is not limited to: slot-bead, slide bead, slot curtain, slide curtain, in single and multilayer coating, tensioned web slot, gravure, roll coating, and other liquid coating and printing processes that apply a liquid on to a substrate or previously deposited layer to form a liquid layer or film that is subsequently dried and/or cured.

The substrate can then be released from the deposited layers to create the article 10. In an aspect, the substrate can be cooled to embrittle an associated release layer, if present. In another aspect, the release layer could be embrittled for example by heating and/or curing with photonic or e-beam energy, to increase the degree of cross-linking, which would enable stripping. The deposited layers can then be stripped mechanically, such as sharp bending or brushing of the surface. The released and stripped layers can be sized into article 10, such as an optical device in the form of a flake, foil, or sheet, using known techniques.

In another aspect, the deposited layers can be transferred from the substrate to another surface. The deposited layers can be punched or cut to produce large flakes with well-defined sizes and shapes.

The liquid coating process can allow for the transfer of the composition of the SLML 14, 14', reflector layer 16, and/or functional molecules 12 at a faster rate as compared to other deposition techniques, such as vapor deposition. Additionally, the liquid coating process can allow for a wider variety of materials to be used in the SLML 14, 14', reflector layer 16, and the functional molecules 12 with a simple equipment set up. It is believed that the layers formed using the disclosed liquid coating process can exhibit improved optical performance.

FIG. 11 illustrates the formation of a layer using a liquid coating process. The composition of a layer, e.g. SLML 14, reflector 16, or functional molecule 12 (a liquid coating composition) can be inserted into a slot die 320 and deposited on a substrate 340 resulting in a wet film. With reference to the processes disclosed above, the substrate 340 can include at least one of a substrate, a release layer, a reflector layer 16, and previously deposited layers. The distance from the bottom of the slot die 320 to the substrate 340 is the slot gap G. As can be seen in FIG. 11, the liquid coating composition can be deposited at a wet film thickness D that is greater than a dry film thickness H. After the wet film of the liquid coating composition has been deposited on the substrate 340, any solvent present in the wet film of the liquid coating composition can be evaporated. The liquid coating process continues with curing of the wet film of the liquid coating composition to result in a cured, self-leveled layer having the correct optical thickness H (ranging from about 30 to about 700 nm). It is believed that the ability of the liquid coating composition to self-level results in a layer having a reduced optical thickness variation across the layer. Ultimately, an article 10, such as an optical device, comprising the self-leveled liquid coating composition can exhibit increased optical precision. For ease of understanding, the terms "wet film" and "dry film" will be used to refer to the liquid coating composition at various stages of the liquid coating process.

The liquid coating process can comprise adjusting at least one of a coating speed and a slot gap G to achieve a wet film with a predetermined thickness D. The liquid coating composition can be deposited having a wet film thickness D ranging from about 0.1 μm to about 500 μm, for example from about 0.1 μm to about 5 μm. The liquid coating composition formed with a wet film thickness D in the disclosed range can result in a stable layer, i.e., without breaks or defects such as ribbing or streaks. In an aspect, the wet film can have a thickness of about 10 to about 12 μm for a stable wet film using a slot die bead mode with a coating speed up to about 100 m/min. In another aspect, the wet film can have a thickness of about 8 to about 10 μm for a stable wet film using a slot die curtain mode with a coating speed up to about 1200 m/min.

The liquid coating process can include a ratio of slot gap G to wet film thickness D of about 1 to about 100 at speeds from about 0.1 to about 1000 m/min. In an aspect, the ratio is about 9 at a coating speed of about 100 m/min. In an aspect, the ratio can be about 20 at a coating speed of about 50 m/min. The liquid coating process can have a slot gap G ranging from about 0 to about 1000 μm. A smaller slot gap G can allow for a reduced wet film thickness. In slot-bead mode higher coating speeds can be achieved with a wet film thickness greater than 10 μm.

The liquid coating process can have a coating speed ranging from about 0.1 to about 1000 m/min, for example from about 25 m/min to about 950 m/min, for example from about 100 m/min to about 900 m/min, and as a further example from about 200 m/min to about 850 m/min. In an aspect, the coating speed is greater than about 150 m/min, and in a further example is greater than about 500 m/min.

In an aspect, the coating speed for a bead mode liquid coating process can range from about 0.1 m/min to about 600 m/min, and for example from about 50 to about 150 m/min. In another aspect, the coating speed for a curtain mode liquid coating process can range from about 200 m/min to about 1500 m/min, and for example, from about 300 m/min to about 1200 m/min.

As shown in FIG. 11 the solvent can be evaporated from the wet film, such as before the wet film is cured. In an aspect, about 100%, for example about 99.9%, and as a further example about 99.8% of the solvent can be evaporated from the liquid coating composition prior to curing of the liquid coating composition. In a further aspect, trace amounts of solvent can be present in a cured/dry liquid coating composition. In an aspect, a wet film having a greater original weight percent of solvent can result in a dry film having a reduced film thickness H. In particular, a wet film having a high weight percent of solvent and being deposited at a high wet film thickness D can result in a liquid coating composition having a low dry film thickness H. It is important to note, that after evaporation of the solvent, the wet film remains a liquid thereby avoiding problems such as skinning, and island formation during the subsequent curing steps in the liquid coating process.

The dynamic viscosity of the wet film can range from about 0.5 to about 50 cP, for example from about 1 to about 45 cP, and as a further example from about 2 to about 40 cP. The viscosity measurement temperature is 25° C., the rheology was measured with an Anton Paar MCR 101 rheometer equipped with a solvent trap using a cone/plate 40 mm diameter with 0.3° angle at a gap setting of 0.025 mm.

In an aspect, the liquid coating composition and the solvent can be selected so that the wet film exhibits Newtonian behavior for precision coating of the liquid coating composition using the liquid coating process. The wet film can exhibit Newtonian behavior shear rates up to 10,000 $s^{-1}$ and higher. In an aspect, the shear rate for the liquid coating process can be 1000 $s^{-1}$ for a coating speed up to 25 m/min, for example 3900 $s^{-1}$ for a coating speed up to 100 m/min, and as a further example 7900 $s^{-1}$ for a coating speed up to 200 m/min. It will be understood that a maximum shear rate can occur on a very thin wet film, such as 1 μm thick.

As the wet film thickness is increased, the shear rate can be expected to decrease, for example decrease 15% for a 10 μm wet film, and as a further example decrease 30% for a 20 μm wet film.

The evaporation of the solvent from the wet film can cause a change in viscosity behavior to pseudoplastic, which can be beneficial to achieve a precision layer, such as a reflector layer 16, and/or SLML 14. The dynamic viscosity of the deposited layer, after any solvent has been evaporated, can range from about 10 cP to about 3000 cP, for example from about 20 cP to about 2500 cP, and as a further example from about 30 cP to about 2000 cP. When evaporating the solvent, if present, from the wet film there can be an increase in viscosity to the pseudoplastic behavior. The pseudoplastic behavior can allow for self-leveling of the wet film.

In an aspect, the method can include evaporating the solvent present in the wet film using known techniques. The amount of time required to evaporate the solvent can be dependent upon the speed of the web/substrate and the dryer capacity. In an aspect, the temperature of the dryer (not shown) can be less than about 120° C., for example less than about 100° C., and as a further example less than about 80° C.

The wet film deposited using a liquid coating process can be cured using known techniques. In an aspect, the wet film can be cured using a curing agent utilizing at least one of an ultraviolet light, visible light, infrared, or electron beam. Curing can proceed in an inert or ambient atmosphere. In an aspect, the curing step utilizes an ultraviolet light source having a wavelength of about 395 nm. The ultraviolet light source can be applied to the wet film at a dose ranging from about 100 mJ/cm$^2$ to about 10000 mJ/cm$^2$, for example ranging from about 200 mJ/cm$^2$ to about 900 mJ/cm$^2$, and as a further example from about 300 mJ/cm$^2$ to about 850 mJ/cm$^2$.

The wet film can crosslink by known techniques. Non-limiting examples include photoinduced polymerization, such as free radical polymerization, spectrally sensitized photoinduced free radical polymerization, photoinduced cationic polymerization, spectrally sensitized photoinduced cationic polymerization, and photoinduced cycloaddition; electron beam induced polymerization, such as electron beam induced free radical polymerization, electron beam induced cationic polymerization, and electron beam induced cycloaddition; and thermally induced polymerization, such as thermally induced cationic polymerization.

A SLML 14, 14', reflector layer 16, and/or functional layer 12 formed using the liquid coating process can exhibit improved optical performance, i.e., be a precision layer. In some examples, a precision layer can be understood to mean a layer having less than about 3% optical thickness variation, about 5% optical thickness variation, or about 7% optical thickness variation across the layer.

In an aspect, the liquid coating process can include adjusting at least one of speed from about 5 to about 100 m/min and a coating gap from about 50 μm to about 100 μm to deposit a wet film from about 2 μm to 10 μm of the deposited layer with a predetermined thickness from about 500 nm to about 1500 nm. In a further aspect, the process can include a speed of 30 m/min, a 75 um gap, 10 um wet film, dry film thickness 1.25 um.

In an example, the SLML 14 can include an aliphatic epoxy resin host using a solvent dye as the SLMM, the reflector layer 16 can include aluminum.

Functional molecules 12 such as polyvinyl alcohol (PVA), polyacrylic acid, waxes, silanes, fluorocarbon waxes, etc. can be used to control the adhesion of the reflector 16 and/or SLML 14 to the substrate, and therefore facilitate release from the substrate.

Functional molecules 12 including oligomers having functional groups such as phosphoric acid, carboxylic acid, hydroxyl, siloxane, etc. can be used to control adhesion to the reflector layer 16 and for charge dissipation.

Functional molecules 12 and oligomers having silane or fluorocarbon groups can enhance the hydrophobicity of the SLML 14, which can enhance its compatibility with a hydrophobic paint vehicle. When a hydrophilic property of the SLML 14 is desired for a paint vehicle, additives containing hydrophilic groups such as hydroxyl, carboxylic acid, phosphoric acid, amine, amide, urea, urethane, etc. can enhance the hydrophilicity of the SLML 14.

Functional molecules, such as crosslinkable dispersants, carboxylate or phosphate containing molecules can increase the adhesion between the SLMP and the host material.

Functional molecules, such as primary and secondary amines, can mitigate oxygen inhibition to UV curing of a deposited layer, such as a reflector layer 16, SLML 14, via free radical polymerization. Furthermore, they can facilitate the dissipation of charge through the SLML 14.

Functional molecules, such as β-Carotene, α-tocopherol, ascorbic acid, quercetin, sterically hindered amines, phenol, etc. can be effective singlet oxygen quenchers.

Functional molecules 12, such as silane and fluorocarbon-containing molecules are strongly hydrophobic; therefore, they can be incorporated into the SLML 14 to minimize moisture diffusing through it.

Functional molecules 12, such as organophosphorus compounds can be used as fire retardants. Phosphoric acid-containing compound can also facilitate the dissipation of charge through the SLML 14.

Functional molecules 12 containing silane and fluorocarbon groups typically have weak intermolecular interaction; as a result, they can be used in the SLML 14 or the reflector layer 16 to minimize flake-flake interactions, i.e., stiction.

Functional molecules 12, such as UV absorbers such as benzoate and benzotriazole, can absorb UV light at a different wavelength range other than the wavelength at which the curing of the SLML 14 host material takes place. Sterically hindered amines can be used in the SLML 14 to protect the SLML 14 from degradation by neutralizing oxygen and peroxy radicals.

Super acid generating molecules such as lodonium-/sulfonium-salts can be utilized as E-beam curing catalyst for cationic SLML host chemistries.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. An optical device, comprising:
   a reflector layer;
   a selective light modulator layer on the reflector layer, wherein the selective light modulator layer includes a host material that is an organic polymer; and functional molecules present in at least one of the selective light modulator layer, an optional functional layer on the selective light modulator layer, or an optional functional layer on the reflector layer;
wherein the functional molecules include at least one group chosen from electric charge dissipation groups; coating bonding groups; and adhesion enhancing groups,
wherein the electric charge dissipation groups are chosen from polyols, phosphoric acid, pyridinum salts, polyethylene glycols, phenols, carbon nanotubes, indium oxide, conductive polymers and combinations thereof;
wherein the coating bonding groups are chosen from vinyl, epoxy, urethane, polyols, phenols, thiols, and combinations thereof;
wherein the adhesion enhancing groups are chosen from siloxanes, polyols, phosphoric acids, anhydrides, acyl halides, and combinations thereof;
wherein a layer of the optical device is not included on at least two sides of the reflector layer;
wherein if the electric charge dissipation groups or the adhesion enhancing groups are phosphoric acids, functional molecules including the phosphoric acid groups also include an acrylate functional group; and
wherein the optical device is a flake having a thickness chosen from a range of 100 nm to 100 μm and a size chosen from a range of 100 nm to 1 mm in size; and wherein the selective light modulator layer and, if present, the optional functional layer on the selective light modulator layer or the optional functional layer on the reflector layer, has an optical thickness variation of less than 5%.

2. The optical device of claim 1, wherein the functional molecules are present in the functional layer on the selective light modulator layer.

3. The optical device of claim 1, wherein the functional molecules are present in the functional layer on the reflector layer.

4. The optical device of claim 1, wherein the functional molecules are present in the selective light modulator layer.

5. The optical device of claim 1, wherein the functional molecules are present in the selective light modulator layer near an external surface of the selective light modulator layer.

6. The optical device of claim 1, wherein the functional molecules are present in the selective light modulator layer near the reflector layer.

7. The optical device of claim 1, wherein the reflector layer includes a first surface and a second surface opposite the first surface; and wherein the selective light modulator layer is a first selective light modulator layer.

8. The optical device of claim 7, wherein the first selective light modulator layer is on the first surface of the reflector layer; and wherein a second selective light modulator layer is on the second surface of the reflector layer.

9. The optical device of claim 8, wherein the functional molecules are present in at least one of the first or second selective light modulator layers.

10. The optical device of claim 8, wherein the functional molecules are present in at least one of an external surface of the first or second selective light modulator layers.

11. The optical device of claim 8, wherein the functional molecules are present in at least one functional layer on at least one of the first or second selective light modulator layers.

12. The optical device of claim 8, wherein the functional molecules are present in at least one of the first or the second selective light modulator layers near the reflector layer.

13. A method of making an optical device, comprising:
depositing on a substrate a reflector layer;
depositing on a surface of the reflector layer a selective light modulator layer, wherein the selective light modulator layer includes a host material that is an organic polymer; and
providing functional molecules in at least one of the selective light modulator layer, in an optional functional layer on the selective light modulator layer, or in an optional functional layer on the reflector layer;
wherein the functional molecules include at least one group chosen from electric charge dissipation groups; coating bonding groups; and adhesion enhancing groups,
wherein the electric charge dissipation groups are chosen from polyols, phosphoric acid, pyridinum salts, polyethylene glycols, phenols, carbon nanotubes, indium oxide, conductive polymers and combinations thereof;
wherein the coating bonding groups are chosen from vinyl, epoxy, urethane, polyols, phenols, thiols, and combinations thereof;
wherein the adhesion enhancing groups are chosen from siloxanes, polyols, phosphoric acids, anhydrides, acyl halides, and combinations thereof;
wherein a layer of the optical device is not included on at least two sides of the reflector layer;
wherein if the electric charge dissipation groups or the adhesion enhancing groups are phosphoric acids, functional molecules including the phosphoric acid groups also include an acrylate functional group; and
wherein the optical device is a flake having a thickness chosen from a range of 100 nm to 100 μm and a size chosen from a range of 100 nm to 1 mm in size; and wherein the selective light modulator layer and, if present, the optional functional layer on the selective light modulator layer or the optional functional layer on the reflector layer, has an optical thickness variation of less than 5%.

14. The method of claim 13, wherein the functional molecules are present in the functional layer on the selective light modulator layer.

15. The method of claim 13, wherein the functional molecules are present in the functional layer on the reflector layer.

16. The method of claim 13, wherein the functional molecules are present in the selective light modulator layer.

17. An optical device, comprising:
a reflector layer;
a selective light modulator layer on the reflector layer, wherein the selective light modulator layer includes a host material that is an organic polymer; and
functional molecules present in the selective light modulator layer;
wherein the functional molecules include at least one group chosen from electric charge dissipation groups; coating bonding groups; and adhesion enhancing groups,
wherein the electric charge dissipation groups are chosen from polyols, phosphoric acid, pyridinum salts, polyethylene glycols, phenols, carbon nanotubes, indium oxide, conductive polymers and combinations thereof;
wherein the coating bonding groups are chosen from vinyl, epoxy, urethane, polyols, phenols, carboxylic acids, thiols, and combinations thereof;

wherein the adhesion enhancing groups are chosen from siloxanes, polyols, phosphoric acids, anhydrides, acyl halides, and combinations thereof;

wherein a layer of the optical device is not included on at least two sides of the reflector layer;

wherein if the electric charge dissipation groups or the adhesion enhancing groups are phosphoric acids, functional molecules including the phosphoric acid groups also include an acrylate functional group; and wherein the optical device is a flake having a thickness chosen from a range of 100 nm to 100 μm and a size chosen from a range of 100 nm to 1 mm in size; and wherein the selective light modulator layer has an optical thickness variation of less than 5%.

18. The optical device of claim 1, wherein the electric charge dissipation group is chosen from polyols, pyridinium salts, polyethylene glycols, phenols, carbon nanotubes, conductive polymers, and combinations thereof; the coating bonding group is chosen from phenols, urethane, polyols, thiols, and combinations thereof; and the adhesion enhancing group is chosen form siloxanes, polyols, anhydrides, acyl halides and combinations thereof.

19. The optical device of claim 17, wherein the electric charge dissipation group is chosen from polyols, pyridinium salts, polyethylene glycols, phenols, carbon nanotubes, conductive polymers, and combinations thereof; the coating bonding group is chosen from phenols, urethane, polyols, thiols, and combinations thereof; and the adhesion enhancing group is chosen form siloxanes, polyols, anhydrides, acyl halides and combinations thereof.

20. The optical device of claim 17, wherein the electric charge dissipation group is chosen from polyols, phosphoric acid, pyridinium salts, polyethylene glycols, carbon nanotubes, conductive polymers, and combinations thereof; the coating bonding group is chosen from polyols, carboxylic acids and combinations thereof; and the adhesion enhancing group is chosen form polyols, phosphoric acid, anhydrides, acyl halides and combinations thereof.

* * * * *